(12) United States Patent
Choi et al.

(10) Patent No.: US 9,961,391 B2
(45) Date of Patent: May 1, 2018

(54) MULTIMEDIA DEVICE AND METHOD FOR DRIVING THE SAME

(71) Applicant: Samsung Display Co., LTD., Yongin, Gyeonggi-Do (KR)

(72) Inventors: Byeong-Hwa Choi, Seoul (KR); Seung-Bae Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 14/919,215

(22) Filed: Oct. 21, 2015

(65) Prior Publication Data

US 2016/0316251 A1   Oct. 27, 2016

(30) Foreign Application Priority Data

Apr. 22, 2015  (KR) .................. 10-2015-0056513

(51) Int. Cl.
| | |
|---|---|
| *H04N 5/04* | (2006.01) |
| *H04N 21/43* | (2011.01) |
| *H04N 21/439* | (2011.01) |
| *H04N 21/442* | (2011.01) |
| *H04N 21/44* | (2011.01) |
| *H04N 21/422* | (2011.01) |
| *H04N 21/4223* | (2011.01) |

(52) U.S. Cl.
CPC ..... *H04N 21/4307* (2013.01); *H04N 21/4223* (2013.01); *H04N 21/42201* (2013.01); *H04N 21/439* (2013.01); *H04N 21/44* (2013.01); *H04N 21/44218* (2013.01)

(58) Field of Classification Search
CPC .. H04N 21/4307; H04N 21/44; H04N 21/439; H04N 21/44218

USPC ......... 348/500, 512, 515, 521; 386/201, 207
See application file for complete search history.

(56) References Cited

U.S. PATENT DOCUMENTS

| | | | |
|---|---|---|---|
| 6,334,778 B1* | 1/2002 | Brown ................ | A61B 5/6896 273/429 |
| 2007/0011196 A1* | 1/2007 | Ball ....................... | H04H 60/45 |
| 2009/0123007 A1* | 5/2009 | Katayama ............... | H04S 7/302 381/300 |
| 2009/0290064 A1* | 11/2009 | Matsumoto ............... | H04S 3/00 348/515 |
| 2011/0134207 A1* | 6/2011 | Corbett .................... | H04N 5/60 348/14.08 |

(Continued)

FOREIGN PATENT DOCUMENTS

| | | |
|---|---|---|
| KR | 1020120025304 A | 3/2012 |
| KR | 1020120051210 A | 5/2012 |
| KR | 1020140106166 A | 9/2014 |

OTHER PUBLICATIONS

Stone, et al., When is now? Perception of simultaneity, The Royal Society, Proc. R. Soc. Lond. B (2001) 268, pp. 31-38.

*Primary Examiner* — Michael Teitelbaum
*Assistant Examiner* — Humam Satti
(74) *Attorney, Agent, or Firm* — Cantor Colburn LLP

(57) ABSTRACT

A multimedia device includes a distance sensor which measures a viewing distance, a controller which controls an output timing of a video signal and an output timing of an audio signal based on the viewing distance, an audio device which outputs a sound in response to the audio signal, and a display device which outputs an image in response to the video signal.

15 Claims, 6 Drawing Sheets

(56) References Cited

U.S. PATENT DOCUMENTS

| | | | |
|---|---|---|---|
| 2013/0010969 A1* | 1/2013 | Cho | H04S 1/002 |
| | | | 381/17 |
| 2013/0057644 A1* | 3/2013 | Stefanoski | G06T 5/50 |
| | | | 348/42 |
| 2014/0297312 A1 | 10/2014 | Bangera et al. | |
| 2014/0354829 A1* | 12/2014 | Cooper | H04N 5/04 |
| | | | 348/194 |
| 2015/0016642 A1* | 1/2015 | Walsh | H04S 7/301 |
| | | | 381/307 |
| 2015/0170712 A1* | 6/2015 | Redmann | G03B 31/02 |
| | | | 386/207 |
| 2016/0134938 A1* | 5/2016 | Miyazaki | H04N 7/142 |
| | | | 348/14.07 |
| 2016/0174011 A1* | 6/2016 | Rider | H04S 7/303 |
| | | | 381/303 |

\* cited by examiner

MULTIMEDIA DEVICE AND METHOD FOR DRIVING THE SAME

This application claims priority to Korean Patent Applications No. 10-2015-0056513, filed on Apr. 22, 2015, and all the benefits accruing therefrom under 35 U.S.C. § 119, the content of which in its entirety is herein incorporated by reference.

BACKGROUND

1. Field

Exemplary embodiments of the invention relate to an electronic device. More particularly, exemplary embodiments of the invention relate to a multimedia device that outputs images and sounds, and a method for driving the multimedia device.

2. Discussion of Related Art

A multimedia device generates video signals and audio signals, and provides video and audio (or images and sounds) to users (or viewers). In general, the multimedia device synchronizes output timings of a video signal and an audio signal and simultaneously outputs the image and sound.

However, a reaction time to visual stimuli and a reaction time to auditory stimuli are different from each other according to a distance (i.e., a viewing distance) between a user and the multimedia device. Thus, there is a time difference between reactions to visual stimuli and reaction to auditory stimuli when the multimedia device simultaneously outputs the image and sound. Further, the time difference between reactions to visual stimuli and reaction to auditory stimuli varies depending on the viewing distance.

SUMMARY

Exemplary embodiments provide a multimedia device controlling output timings of image and sound based on a viewing distance.

Exemplary embodiments provide a method for the multimedia device.

According to exemplary embodiments, a multimedia device includes a distance sensor which measures a viewing distance, a controller which controls an output timing of a video signal and an output timing of an audio signal based on the viewing distance, an audio device which outputs a sound in response to the audio signal, and a display device which outputs an image in response to the video signal.

In exemplary embodiments, the controller may determine a first reaction time to visual stimuli based on the viewing distance and a second reaction time to auditory stimuli based on the viewing distance, and the controller may adjust the output timings of the video signal and the audio signal based on a reaction time difference between the first reaction time and the second reaction time.

In exemplary embodiments, the first reaction time may be determined to have a substantially constant value independently of the viewing distance.

In exemplary embodiments, the second reaction time may be determined to linearly increase as the viewing distance increases.

In exemplary embodiments, an output time difference between the output timing of the video signal and the output timing of the audio signal may be substantially the same as the reaction time difference.

In exemplary embodiments, the first reaction time may be determined to linearly decrease as the viewing distance increases.

In exemplary embodiments, the second reaction time may be determined to linearly increase as the viewing distance increases.

In exemplary embodiments, the controller may determine a reference distance at which the first reaction time is substantially equal to the second reaction time.

In exemplary embodiments, the controller may output the video signal and the audio signal substantially at the same time when the viewing distance is substantially the same as the reference distance.

In exemplary embodiments, the controller may output the video signal before an output of the audio signal based on the reaction time difference when the viewing distance is less than the reference distance.

In exemplary embodiments, an output time difference between the output timing of the video signal and the output timing of the audio signal may be substantially the same as the reaction time difference.

In exemplary embodiments, the controller may output the audio signal before an output of the video signal based on the reaction time difference when the viewing distance is greater than the reference distance.

In exemplary embodiments, an output time difference between the output timing of the video signal and the output timing of the audio signal may be substantially the same as the reaction time difference.

In exemplary embodiments, the controller may include a calculator which calculates the reaction time difference based on the viewing distance, a synchronization signal controller which controls the output timings of an audio synchronization signal and a video synchronization signal based on the reaction time difference, an audio signal processor which generates the audio signal based on an audio process of input data and provides the audio signal to the audio device based on the audio synchronization signal, and a video signal processor which generates the video signal based on an video process of the input data and provides the video signal to the display device based on the video synchronization signal.

In exemplary embodiments, the distance sensor may calculate the viewing distance using an infrared radiation.

According to exemplary embodiments, a method for driving a multimedia device includes measuring a viewing distance between an user and the multimedia device, calculating a reaction time difference between a first reaction time to visual stimuli and a second reaction time to auditory stimuli, based on the viewing distance, adjusting an output timing of the audio signal and an output timing of the video signal based on the reaction time difference, and outputting a sound and an image based on the audio signal and the video signal.

In exemplary embodiments, the first reaction time may be determined to have a substantially constant value independently of the viewing distance.

In exemplary embodiments, the second reaction time may be determined to linearly increase as the viewing distance increases.

In exemplary embodiments, an output time difference between the output timing of the video signal and the output timing of the audio signal may be substantially the same as the reaction time difference.

In exemplary embodiments, an output time difference between the output timing of the video signal and the output timing of the audio signal may correspond to clock signal durations which is the nearest to the reaction time difference.

In exemplary embodiments of the invention, the multimedia device and the method for driving the multimedia device may control the output timings of the video and audio signals differently from each other based on the reaction times to the visual stimuli and the auditory stimuli such that a user may substantially simultaneously recognize the image and the sound from the multimedia device. Thus, in such embodiments, optimal viewing environment may be provided to the user and user convenience may be improved.

BRIEF DESCRIPTION OF THE DRAWINGS

The above and other features of the invention will become more apparent by describing in detailed exemplary embodiments thereof with the accompanying drawings, in which.

DETAILED DESCRIPTION OF EMBODIMENTS

Figure 1:
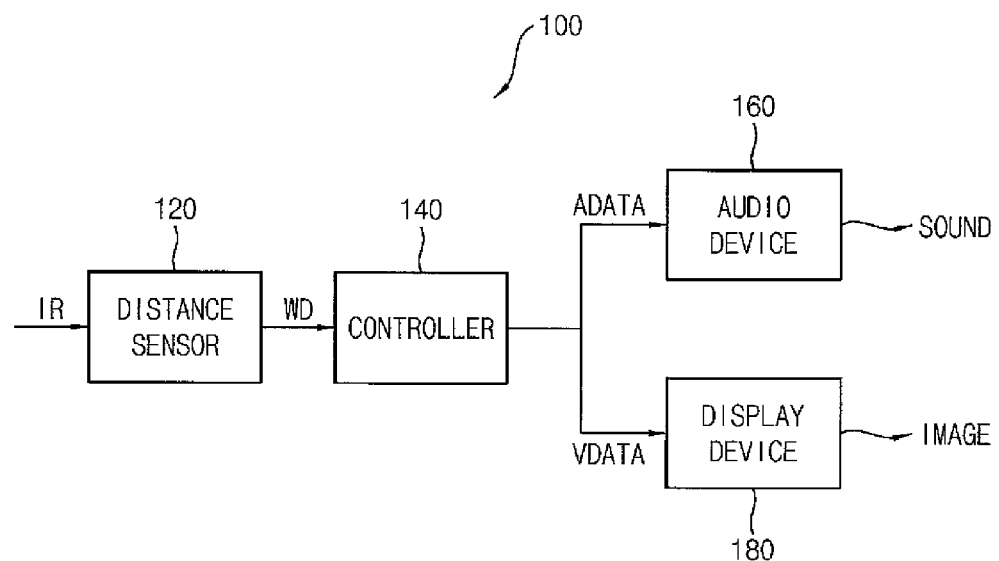
FIG. 1 is a block diagram of an exemplary embodiment of a multimedia device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Exemplary embodiments will be described more fully hereinafter with reference to the accompanying drawings, in which various embodiments are shown.

FIG. 1 is a block diagram of an exemplary embodiment of a multimedia device according to the invention.

Referring to FIG. 1, an exemplary embodiment of the multimedia device 100 includes a distance sensor 120, a controller 140, an audio device 160 and a display device 180.

The multimedia device 100 may include various types of devices for processing broadcast data, etc. The multimedia device 100 may further include a wired and/or wireless communication device such that internet, e-mail, web browsing, game functions, etc. may be further performed. In one exemplary embodiment, for example, the multimedia device 100 may be a computer, a television, a notebook, a smart phone, a smart pad, etc., but constructions of the multimedia device 100 are not limited thereto.

The distance sensor 120 measures a viewing distance WD. The viewing distance WD may be defined as a distance between a face of a user and the multimedia device 100 (e.g., the display device 180). The distance sensor 120 may provide the measured viewing distance WD to the controller 140. In an exemplary embodiment, the distance sensor 120 may calculate the viewing distance WD using an infrared radiation. In one exemplary embodiment, for example, the distance sensor 120 may include an infrared camera or a depth camera. The distance sensor 120 may calculate the viewing distance WD using a method of analyzing a returning time of radiated infrared rays, or a method of radiating a specific patterned infrared rays and analyzing changed patterns of the infrared rays. In an alternative exemplary embodiment, the distance sensor 120 may recognize the face of the user using a camera and calculate the viewing distance WD based on a recognized result. In exemplary embodiments of the invention, constructions of the distance sensor 120 and methods for measuring the viewing distance WD are not limited to those described herein.

The controller 140 may determine a first reaction time to visual stimuli based on the viewing distance WD and a second reaction time to auditory stimuli based on the viewing distance WD. The first reaction time to visual stimuli may be defined as an elapsed time between a time when the multimedia device outputs the image and a time when the user recognizes the image. The second reaction time to auditory stimuli may be defined as an elapsed time between a time when the multimedia device outputs the sound and when the user recognizes the sound. In an exemplary embodiment, the controller 140 may include database or equations of a relation between the viewing distance WD and the first reaction time and a relation between the viewing distance WD and the second reaction time. In such an embodiment, the controller 140 may adjust the output timings of the video signal VDATA and the audio signal ADATA based on a reaction time difference between the first reaction time and the second reaction time. Accordingly, a specific relation model of the reaction times to visual and auditory stimulus may be applied to the operation of the controller 140.

In an exemplary embodiment, the first reaction time is determined to have a substantially uniform or constant value regardless of a change of the viewing distance WD, that is, independently of the viewing distance WD, and the second reaction time is determined to linearly increase as the viewing distance WD increases. Relations between the first and second reaction times and the viewing distance WD may be set in the controller 140.

The controller 140 may determine an output time difference between the output timing of the video signal VDATA and the output timing of the audio signal ADATA substantially in proportion to the reaction time difference. In an exemplary embodiment, when a video synchronization signal is enabled, the video signal VDATA may be provided to the display device 180. In such an embodiment, when an audio synchronization signal is enabled, the audio signal ADATA may be provided to the audio device 160. The controller 140 control enable timings of the video and audio synchronization signals based on the reaction time difference such that an output time difference between the video signal VDATA and the audio signal ADATA may be adjusted. In an exemplary embodiment, the output time difference between the output timing of the video signal VDATA and the output timing of the audio signal ADATA may be substantially the same as the reaction time difference. In an alternative exemplary embodiment, the output time difference may correspond to clock signal durations which is the nearest to the reaction time difference.

The controller 140 may determine a reference distance at which the first reaction time is substantially equal to the second reaction time. When the viewing distance WD is substantially the same as the reference distance WD, the controller 140 may output the video signal VDATA and the audio signal ADATA at substantially the same time. Thus, the multimedia device 100 may substantially simultaneously output the video signal VDATA and the audio signal ADATA.

In an exemplary embodiment, when the viewing distance WD is less than the reference distance, the controller 140 may output the video signal VDATA before an output of the audio signal ADATA based on the reaction time difference. In an exemplary embodiment, when the viewing distance WD is greater than the reference distance, the controller may output the audio signal ADATA before the output of the video signal VDATA based on the reaction time difference. Here, the output time difference between the video and audio signals VDATA and ADATA may be substantially proportional to or substantially equal to the reaction time difference.

The audio device 160 may output the sound based on the audio signal ADATA. The audio signal ADATA generated in the controller 140 may be provided to the audio device 160. The audio device 160 may receive the audio signal ADATA, for example, stereo data, 3.1 channel data or 5.1 channel data, and output the sound. The audio device 160 may include a speaker, e.g., at least one of various types of speakers.

The display device 180 may output the image based on the video signal VDATA. In an exemplary embodiment, the display device 180 may convert the video signal VDATA, data signals, etc., received from the controller 160 and external devices into red, green and blue ("RGB") signals such that display panel driving signals may be generated. The display device 180 may include the display panel for displaying the image. The display panel may be an organic light emitting display panel, liquid crystal display panel, etc. The display panel may include a plat panel, curved panel or flexible panel, for example. In exemplary embodiments, the display panel is not limited to those described herein.

In an exemplary embodiment, as described above, the multimedia device 100 may adjust or control the output timings of the video and audio signals VDATA and ADATA differently from each other based on the reaction times to the visual stimuli and the auditory stimuli such that users may substantially simultaneously recognize the image and the sound from the multimedia device 100. Thus, optimal viewing environment may be provided to the users and user convenience may be improved.

Figure 2:
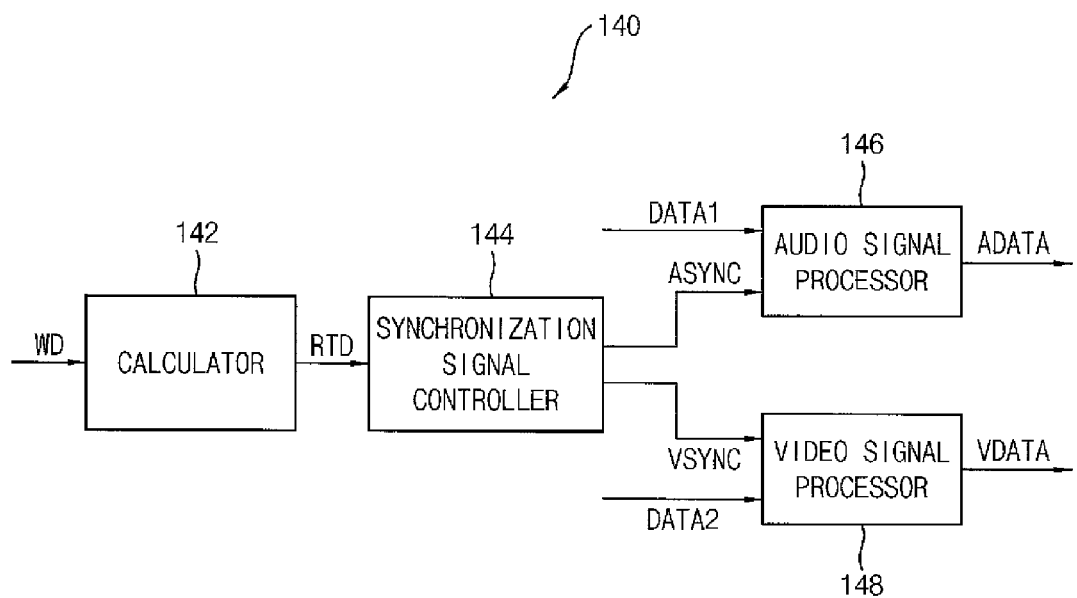
FIG. 2 is a block diagram illustrating an exemplary embodiment of a controller of the multimedia device of FIG. 1.

FIG. 2 is a block diagram illustrating an exemplary embodiment of a controller of the multimedia device of FIG. 1.

Referring to FIGS. 1 and 2, an exemplary embodiment of the controller 140 may include a calculator 142, a synchronization signal controller 144, an audio signal processor 146 and a video signal processor 148.

The calculator 142 may calculate the reaction time difference RTD based on the viewing distance WD. The calculator 142 may receive viewing distance WD data from the distance sensor 120. The calculator 142 may extract the first and second reaction times corresponding to the viewing distance WD, and calculate the reaction time difference RTD between the first and second reaction times. In an exemplary embodiment, the calculator 142 may include a first table or storage that stores a relation model between the viewing distance WD and the first reaction time and a second table or storage that stores a relation model between the viewing distance WD and the second reaction time. In one exemplary embodiment, for example, the first reaction time may be a substantially constant value, independently of the viewing distance or regardless of a change of the viewing distance WD and the second reaction time may be a value that is substantially linearly increased as the viewing distance WD increases.

In an exemplary embodiment, the calculator 142 may further include a subtractor for calculating the reaction time difference RTD. The reaction time difference RTD may be within several hundreds milliseconds (ms) ranges. The calculator 142 may provide data including the reaction time difference RTD to the synchronization signal controller 144.

In an exemplary embodiment, the synchronization signal controller 144 may control output timings (e.g., enable timings) of the audio synchronization signal ASYNC and the video synchronization signal VSYNC based on the reaction time difference RTD. In such an embodiment, the audio synchronization signal ASYNC may control a timing at which the audio signal ADATA is applied to the audio device 160, and the video synchronization signal VSYNC may control a timing at which the video signal VDATA is applied to the display device 180. In an exemplary embodiment, the synchronization signal controller 144 may adjust an output time difference between the audio synchronization signal ADATA and the video synchronization signal VDATA to be substantially the same as the reaction time difference RTD. In such an embodiment, the synchronization signal controller 144 may adjust the output time difference between the audio synchronization signal ADATA and the video synchronization signal VDATA to correspond to the clock signal durations which is the nearest to the reaction time difference RTD.

The synchronization signal controller 144 may output the audio synchronization signal ASYNC to the audio signal processor 146 and output the video synchronization signal VSYNC to the video signal processor 148.

The audio signal processor 146 may receive input data DATA1 having audio information from an external device and receive the audio synchronization signal ASYNC from the synchronization signal controller 144. The audio signal processor 146 may perform an audio signal process to the input data DATA1 to generate the audio signal ADATA. The audio signal processor 146 may provide the audio signal ADATA to the audio device 160 based on the audio synchronization signal ASYNC. Here, the input data DATA1 may be decoded stream signals including the audio information. The audio signal processor 146 may output the audio signal ADATA when the audio synchronization signal ASYNC is output.

The video signal processor 148 may receive input data DATA2 having video information from the external device and receive the video synchronization signal VSYNC from the synchronization signal controller 144. The video signal processor 148 may perform a video signal process to the input data DATA2 to generate the video signal VDATA. The audio signal processor 146 may provide the audio signal ADATA to the video device 180 based on the video synchronization signal VSYNC. Here, the input data DATA2 may be decoded stream signals including the video information. The video signal processor 148 may output the video signal VDATA when the video synchronization signal VSYNC is output.

Accordingly, in such an embodiment, the output timings of the audio and video synchronization signals ASYNC and VSYNC may be adjusted based on the reaction time difference RTD. Thus, the output timings of the audio and video signals ADATA and VDATA may be controlled based on the output timings of the audio and video synchronization signals ASYNC and VSYNC to allow a user to substantially simultaneously recognize a sound generated based on the audio information and an image generated based on the video information.

Figure 3:
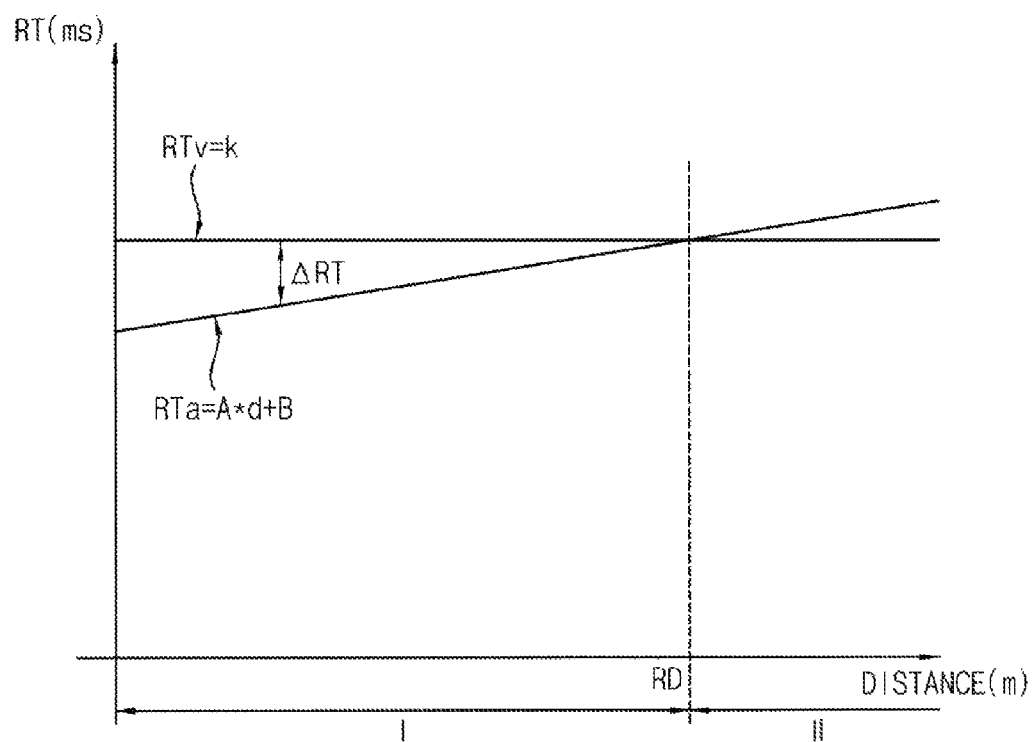
FIG. 3 illustrates a graph showing reaction times, based on which an exemplary embodiment of the controller of FIG. 1 calculates a reaction time difference.

FIG. 3 illustrates a graph showing reaction times, based on which an exemplary embodiment of the controller of FIG. 1 calculates a reaction time difference.

Referring to FIGS. 1 and 3, in an exemplary embodiment, the controller 140 may calculate a reaction time difference $\Delta RT$ based on a first reaction time RTv and a second reaction time RTa.

In FIG. 3, a graph of the first reaction time RTv shows standardized values of visual stimuli of the human according to a distance change (e.g., a viewing distance WD change). In an exemplary embodiment, the first reaction time RTv may be determined to have a substantially uniform or constant value, independently of the viewing distance or regardless of the change of the viewing distance WD. In one exemplary embodiment, for example, the first reaction time RTv may be expressed as the following Equation 1.

$$Rtv = k \qquad \text{Equation 1}$$

In Equation 1, k is a constant.

The speed of light is about 300,000 meter per second (m/s) and the speed of sound is about 340 m/s such that the multimedia device 100 (e.g., the controller 140) may determine the first reaction time RTv to have a substantially uniform or constant value, independently of the viewing distance or regardless of a change of the viewing distance WD.

In FIG. 3, a graph of the second reaction time RTa shows standardize values of auditory stimuli of the human according to the distance change (e.g., a viewing distance WD change). In an exemplary embodiment, the second reaction time RTa may be determined to linearly increase as the viewing distance WD increases. In one exemplary embodiment, for example, the second reaction time RTa may be expressed as the following Equation 2.

$$RTa = A \times d + B \qquad \text{Equation 2}$$

In Equation 2, A denotes an auditory stimuli reaction coefficient, B denotes a shortest reaction time, and d denotes a viewing distance WD. Thus, the controller 140 may determine the second reaction time RTa to linearly increase as the viewing distance WD increases.

The controller 140 may calculate a difference between the first and second reaction times RTv and RTa to obtain the reaction time difference $\Delta RT$.

As illustrated in FIG. 3, the graphs show a distance point (i.e., a reference distance RD) at which the first reaction time RTv and the second reaction time RTa are substantially the same as each other. In one exemplary embodiment, for example, the reference distance RD may be determined to be about 10.6 meters (m). In an exemplary embodiment, the controller 140 may output the video signal VDATA and the audio signal ADATA at substantially the same time when the viewing distance WD is substantially the same as the reference distance RD. Thus, the multimedia device 100 may output an image corresponding to the video signal VDATA and a sound corresponding to the audio signal ADATA at substantially the same time.

The viewing distance WD may be less than the reference distance RD in a first range I. In the first range I, the controller 140 may output the video signal VDATA before an output of the audio signal ADATA based on the reaction time difference $\Delta RT$. In an exemplary embodiment, an output time difference between the output timing of the video signal VDATA and the output timing of the audio signal ADATA may be substantially the same as the reaction time difference ΔRT. In an alternative exemplary embodiment, the output time difference between the output timing of the video signal VDATA and the output timing of the audio signal ADATA may correspond to clock signal durations which is the nearest to the reaction time difference ΔRT. As illustrated in FIG. 3, the reaction time difference ΔRT may be linearly decreased as the viewing distance WD increases.

The viewing distance WD may be greater than the reference distance RD in a second range II. In the second range II, the controller 140 may output the audio signal ADATA before the output of the video signal VDATA based on the reaction time difference ΔRT. In an exemplary embodiment, the output time difference between the output timing of the video signal VDATA and the output timing of the audio signal ADATA may be substantially the same as the reaction time difference ΔRT. In an alternative exemplary embodiment, the output time difference between the output timing of the video signal VDATA and the output timing of the audio signal ADATA may correspond to clock signal durations which is the nearest to the reaction time difference ΔRT. As illustrated in FIG. 3, the reaction time difference ΔRT may be linearly increased as the viewing distance WD increases.

Accordingly, in an exemplary embodiment, the controller 140 may generate the reaction time difference ΔRT data based on the viewing distance WD.

Figure 4:
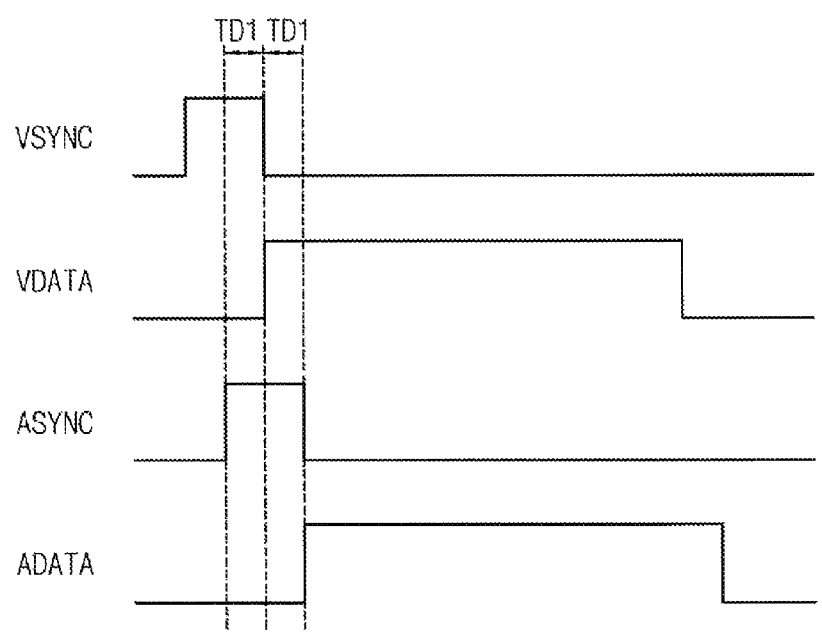
FIG. 4 is a timing diagram illustrating an example of outputs of an audio signal and a video signal based on the reaction time of FIG. 3.
Figure 5:
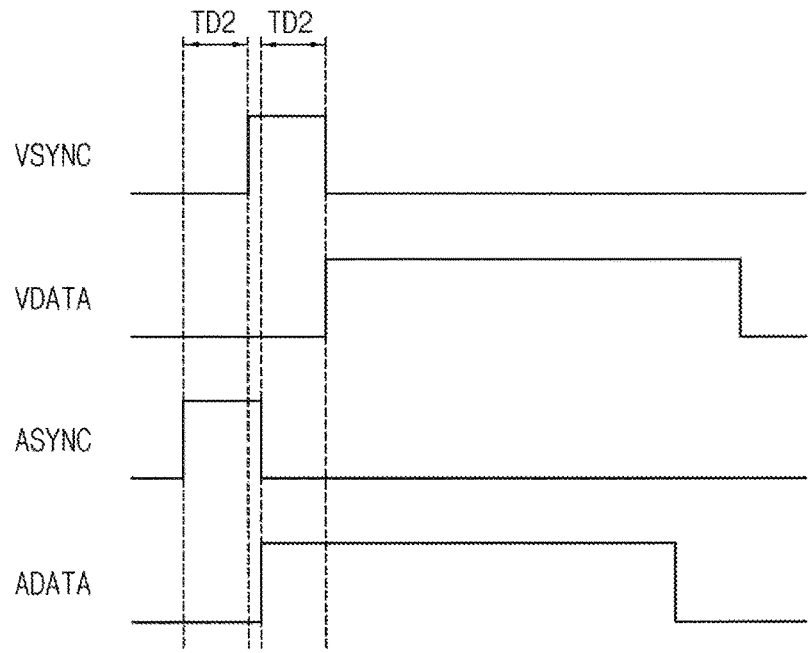
FIG. 5 is a timing diagram illustrating another example of outputs of an audio signal and a video signal based on the reaction time of FIG. 3.

FIG. 4 is a timing diagram illustrating an example of outputs of an audio signal and a video signal based on the reaction time of FIG. 3. FIG. 5 is a timing diagram illustrating another example of outputs of an audio signal and a video signal based on the reaction time of FIG. 3.

Referring to FIGS. 3 to 5, in an exemplary embodiment, output time differences TD1 and TD2 of the video signal VDATA and the audio signal ADATA may be controlled based on the reaction time difference ΔRT.

In an exemplary embodiment, the controller 140 may generate data including the reaction time difference ΔRT and control the output timings of the video synchronization signal VSYNC and the output timing of the audio synchronization signal ASYNC based on the reaction time difference ΔRT. In such an embodiment, the controller 140 may output the video signal VDATA and the audio signal ADATA based on the output of the video synchronization signal VSYNC and the audio synchronization signal ASYNC, respectively.

In an exemplary embodiment, the output time differences TD1 and TD2 may be substantially the same as the reaction time difference ΔRT. In an alternative exemplary embodiment, the output time differences TD1 and TD2 may correspond to the clock signal durations which is the nearest to the reaction time difference ΔRT.

In an exemplary embodiment, as illustrated in FIG. 4, the video synchronization signal VSYNC may be output before the audio synchronization signal ASYNC when the viewing distance WD is in the first range I. Thus, the video signal VDATA may be output before the audio signal ADATA. In this case, the output time difference TD1 between the video synchronization signal VSYNC and the audio synchronization signal ASYNC may be substantially the same as the output time difference TD1 between the video signal VDATA and the audio signal ADATA.

In an exemplary embodiment, as illustrated in FIG. 5, the audio synchronization signal ASYNC may be output before the video synchronization signal VSYNC when the viewing distance WD is within the second range II. Thus, the audio signal ADATA may be output before the video signal VDATA. In this case, the output time difference TD2 between the video synchronization signal VSYNC and the audio synchronization signal ASYNC may be substantially the same as the output time difference TD2 between the video signal VDATA and the audio signal ADATA.

In an exemplary embodiment, as described above, the multimedia device 100 may adjust or control the output timings of the video and audio signals VDATA and ADATA differently from each other based on the reaction times to the visual stimuli and the auditory stimuli such that a user may substantially simultaneously recognize the image and the sound from the multimedia device 100. Thus, optimal viewing environment may be provided to the user and user convenience may be improved.

Figure 6:
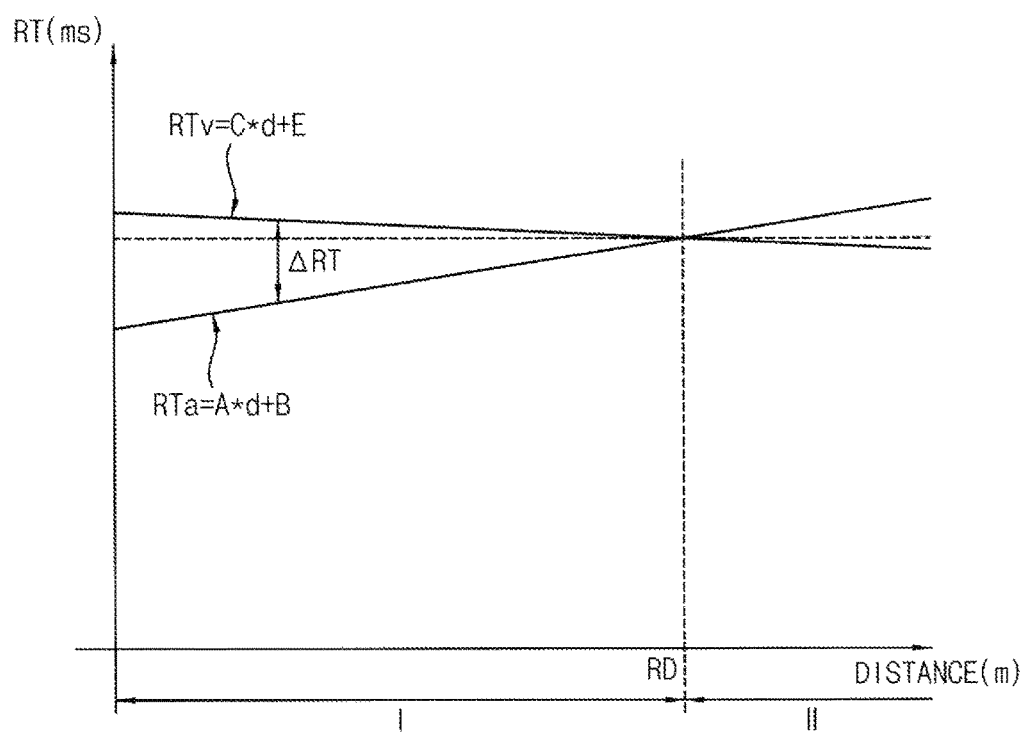
FIG. 6 is another graph showing reaction times, based on which an exemplary embodiment of the controller of FIG. 1 calculates a reaction time difference.

FIG. 6 is another graph showing reaction times, based on which an alternative exemplary embodiment of the controller of FIG. 1 calculates a reaction time difference.

Such an embodiment, the controller is substantially the same as or similar to the controller 140 in an exemplary embodiment described above with reference to FIG. 3 except for a relation between the viewing distance WD and the first reaction time RTv. Thus, the same reference numerals will be used to refer to the same or like parts as those described in the exemplary embodiments described above with reference to FIG. 3, and any repetitive detailed description thereof will be omitted.

Referring to FIGS. 1 and 6, in an exemplary embodiment, the controller 140 may calculate the reaction time difference ΔRT based on a first reaction time RTv and a second reaction time RTa.

In an exemplary embodiment, the first reaction time RTv may be linearly decreased as the viewing distance WD increases. In one exemplary embodiment, for example, the first reaction time RTv may be expressed as the following Equation 3.

$$RTv = C \times d + E \qquad \text{Equation 3}$$

In Equation 3, C denotes a visual stimuli reaction coefficient, E denotes a constant, and d denotes a viewing distance WD. Thus, the controller 140 may determine the first reaction time RTv to linearly decrease as the viewing distance WD increases.

In such an embodiment, the controller 140 may calculate a difference between the first and second reaction times RTv and RTa to obtain the reaction time difference ΔRT.

Figure 7:
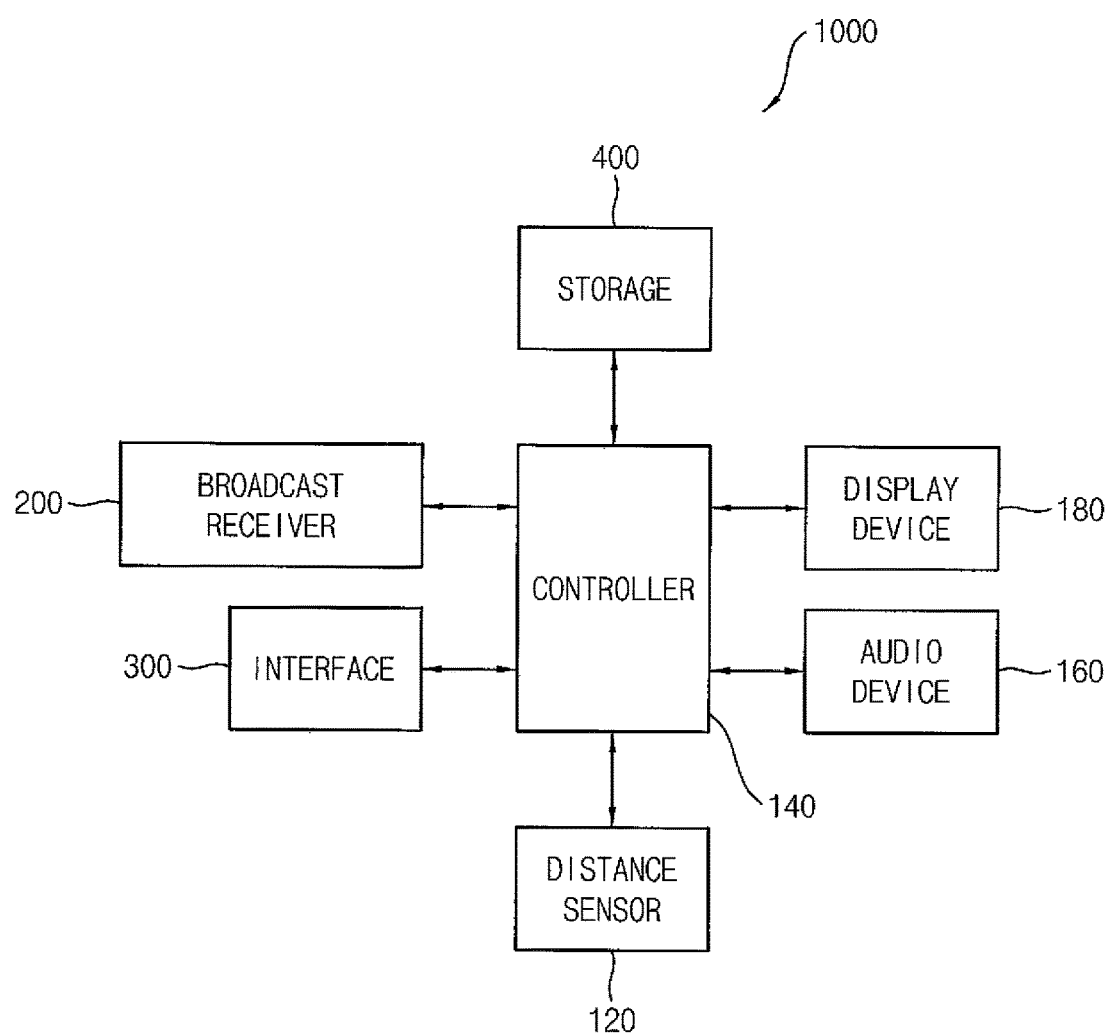
FIG. 7 is a block diagram of an exemplary embodiment of a multimedia device according to the invention.

FIG. 7 is a block diagram of an exemplary embodiment of a multimedia device according to the invention.

Referring to FIGS. 1 and 7, an exemplary embodiment of the multimedia device 1000 may include a distance sensor 120, a controller 140, an audio device 160, and a display device 180. In such an embodiment, the multimedia device 1000 may further include a broadcast receiver 200, an interface 300 and a storage 400.

The multimedia device 1000 of FIG. 7 is substantially the same as or similar to the embodiments of the multimedia device described above with reference to FIG. 1 except for the broadcast receiver 200, the interface 300, and the storage 400. The same or like elements shown in FIG. 7 have been labeled with the same reference characters as used above to describe the exemplary embodiments of the multimedia device shown in FIG. 1, and any repetitive detailed description thereof will be omitted In an exemplary embodiment, the broadcast receiver 200 may include a tuner, a demodulator, and a network interface. The tuner may receive a radio frequency ("RF") broadcast signal through an antenna. The tuner may select RF broadcast signals corresponding to stored entire channel or selected one among the RF broadcast signals.

The modulator may perform demodulation and channel decoding, and output stream signals. The stream signals may be multiplexed signals of video signals, audio signals, or data signals. The stream signals may be input to the controller 140. The controller 140 may perform demultiplexing, video/audio signal processing, etc., output an audio signal to the audio device 160, and output a video signal to the display device 180.

The network interface 300 may provide an interface by which the multimedia device 1000 connects to wire/wireless networks including internet network.

Interface 300 may include an external device interface and a user interface. The external device interface may be connected to an external device such as a digital versatile disk ("DVD"), a blue-ray, a game console, an image sensor, a camcorder or a computer, for example. The external device interface may transmit the video signals, audio signals, and/or data signals from the external device to the controller 140. In such an embodiment, the external device interface may output processed video signals, audio signals, and/or data signals from the controller 140 to the external device. The user interface may transmit an input signal from a user to the controller 140 and/or a signal from the controller 140 to the user.

The storage 400 may store programs for processing and controlling the signals in the controller 140 and store the video signals, audio signals, and/or data signals performed signal processes. The storage 400 may perform temporary storage functions of the video signals, audio signals, and/or data signals from the interfaces.

The distance sensor 120 may measure a viewing distance.

The controller 140 may perform demultiplexing the input streams from the broadcast receiver 200 or the interface 300 or processing demultiplexed signals such that the video signal for outputting an image and the audio signal for outputting a sound may be generated and output. The controller 140 may control an output timing of the video signal and an output timing of the audio signal based on the viewing distance. The controller 140 may determine a first reaction time to visual stimuli based on the viewing distance and a second reaction time to auditory stimuli based on the viewing distance. The controller 140 may adjust the output timings of the video signal and the audio signal based on a reaction time difference between the first reaction time and the second reaction time.

The audio device 160 may output the sound based on the audio signal. The display device 180 may output the image based on the video signal.

In such an embodiment, as described above, the multimedia device 1000 may adjust or control the output timings of the video and audio signals differently from each other based on the reaction times to the visual stimuli and the auditory stimuli such that users may substantially simultaneously recognize the image and the sound from the multimedia device 1000. Thus, in such an embodiment, optimal viewing environment may be provided to the users and user convenience may be improved.

Figure 8:
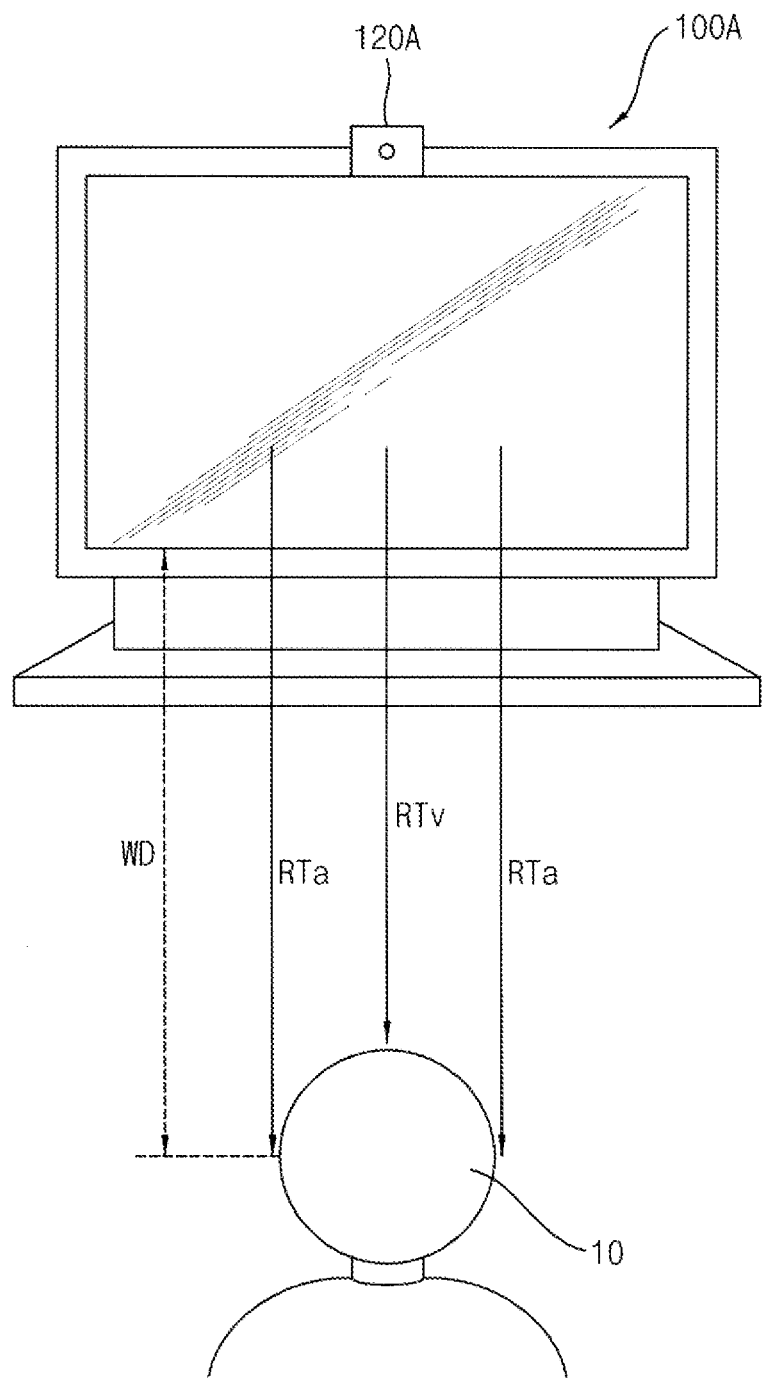
FIG. 8 illustrates a user and an exemplary embodiment of a multimedia device according to the invention.

FIG. 8 illustrates a user and an exemplary embodiment of a multimedia device according to the invention.

Referring to FIGS. 1 and 8, an exemplary embodiment of the multimedia device 100A may control output timings of an image and a sound that is synchronized with the image based on a viewing distance WD.

The multimedia device may include a distance sensor 120A that senses the user 10 and measures the viewing distance WD.

The multimedia device 100A may adjust or control output timings of the image and the sound based on a reaction time difference between a reaction time to visual stimuli RTv and a reaction time to auditory stimuli RTa. The multimedia device 100A shown in FIG. 8 is substantially the same as the exemplary embodiments of the multimedia device described above with reference to FIGS. 1 to 7, and any repetitive detailed description thereof will be omitted.

In such an embodiment, the multimedia device 100A may control the output timings of the video and audio signals based on the viewing distance WD such that users may substantially simultaneously recognize the image and the sound from the multimedia device 1000. Thus, optimal viewing environment may be provided to the users regardless of location of user.

Figure 9:
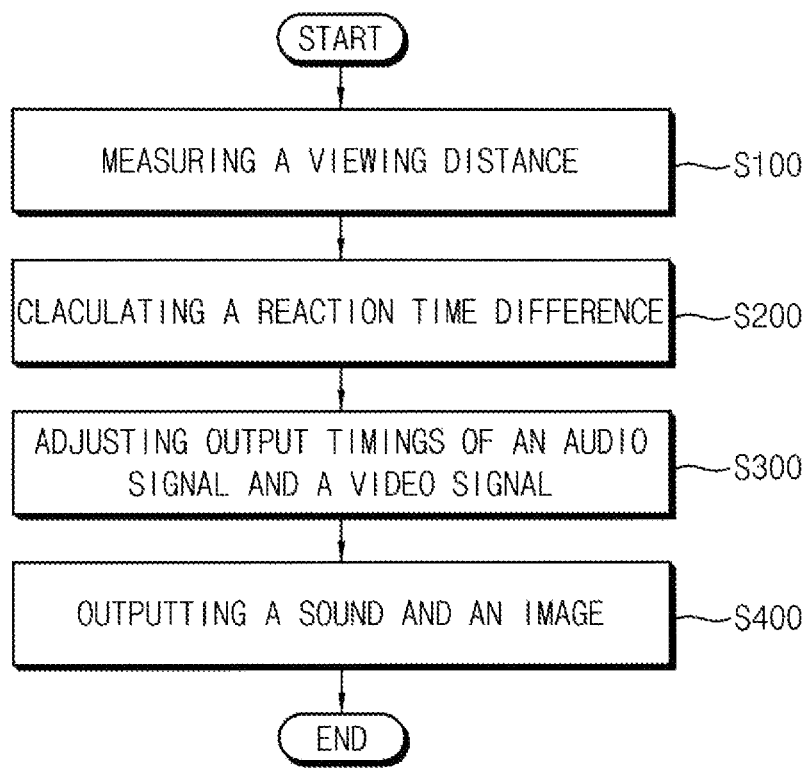
FIG. 9 is a flow chart illustrating an exemplary embodiment of a method for driving a multimedia device according to the invention.

FIG. 9 is a flow chart showing an exemplary embodiment of a method for driving a multimedia device, according to the invention.

Referring to FIG. 9, an exemplary embodiment of the method for driving the multimedia device may include measuring a viewing distance S100, calculating a reaction time difference based on the viewing distance S200, adjusting an output timing of the audio signal and an output timing of the video signal based on the reaction time difference S300, and outputting a sound and an image of the audio signal and the video signal based on the adjusted output timing thereof S400.

In such an embodiment, the viewing distance may be measured S100. In one exemplary embodiment, for example, the viewing distance may be measured by a distance sensor. The distance sensor may include an infrared camera or depth camera, for example.

The reaction time difference between a first reaction time to visual stimuli and a second reaction time to auditory stimuli may be calculated based on the viewing distance S200. A relation model between the first reaction times and the viewing distance and a relation model between the second reaction times and the viewing distance may be applied to the multimedia device. The reaction time difference may be calculated by the relation models. In an exemplary embodiment, the first reaction time may be determined to have a substantially uniform or constant value, independently of the viewing distance or regardless of a change of the viewing distance, and the second reaction time may be determined to linearly increase as the viewing distance increases.

The output timing of the audio signal and the output timing of the video signal may be adjusted based on the reaction time difference S300. In an exemplary embodiment, an output time difference between the output timing of the video signal and the output timing of the audio signal is substantially the same as the reaction time difference. In an exemplary embodiment, the output time difference between the output timing of the video signal and the output timing of the audio signal corresponds to clock signal durations which is the nearest to the reaction time difference.

The sound and the image may be respectively output based on the audio signal and the video signal. In one exemplary embodiment, for example, when the video signal is output before the audio signal output, the image may be output before the sound output. Accordingly, in such an embodiment, user may substantially simultaneously recognize the image and the sound from the multimedia device.

Thus, optimal viewing environment may be provided to the users and user convenience may be improved.

Such an embodiment of a method for driving a multimedia device may be applied to any display device and any system including the display device. In one exemplary embodiment, for example, such an embodiment may be applied to a television, a computer monitor, a laptop, a digital camera, a cellular phone, a smart phone, a smart pad, a personal digital assistant ("PDA"), a portable multimedia player ("PMP"), a MP3 player, a navigation system, a game console or a video phone.

The foregoing is illustrative of exemplary embodiments, and is not to be construed as limiting thereof. Although a few exemplary embodiments have been described, those skilled in the art will readily appreciate that many modifications are possible in the exemplary embodiments without materially departing from the novel teachings and advantages of exemplary embodiments. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A multimedia device comprising:
   a distance sensor which measures a viewing distance;
   a controller which determines a reaction time difference between a first reaction time to visual stimuli and a second reaction time to auditory stimuli, based on the viewing distance and a shortest reaction time to auditory stimuli and adjusts an output timing of the audio signal or an output timing of the video signal based on the reaction time difference;
   an audio device which outputs a sound in response to the audio signal; and
   a display device which outputs an image in response to the video signal,
   wherein the controller further determines a reference distance at which the first reaction time is substantially equal to the second reaction time, outputs the video signal and the audio signal substantially at the same time when the viewing distance is substantially the same as the reference distance, outputs the video signal before an output of the audio signal based on the reaction time difference when the viewing distance is less than the reference distance, and outputs the audio signal before an output of the video signal based on the reaction time difference when the viewing distance is greater than the reference distance.

2. The multimedia device of claim 1, wherein the first reaction time is determined to have a substantially constant value independently of the viewing distance.

3. The multimedia device of claim 2, wherein the second reaction time is determined to linearly increase as the viewing distance increases.

4. The multimedia device of claim 3, wherein an output time difference between the output timing of the video signal and the output timing of the audio signal is substantially the same as the reaction time difference.

5. The multimedia device of claim 1, wherein the first reaction time is determined to linearly decrease as the viewing distance increases.

6. The multimedia device of claim 5, wherein the second reaction time is determined to linearly increase as the viewing distance increases.

7. The multimedia device of claim 1, wherein an output time difference between the output timing of the video signal and the output timing of the audio signal is substantially the same as the reaction time difference.

8. The multimedia device of claim 1, wherein an output time difference between the output timing of the video signal and the output timing of the audio signal is substantially the same as the reaction time difference.

9. The multimedia device of claim 1, wherein the controller comprises:
   a calculator which calculates the reaction time difference based on the viewing distance;
   a synchronization signal controller which controls the output timings of an audio synchronization signal and a video synchronization signal based on the reaction time difference;
   an audio signal processor which generates the audio signal based on an audio process of input data and provides the audio signal to the audio device based on the audio synchronization signal; and
   a video signal processor which generates the video signal based on a video process of the input data and provides the video signal to the display device based on the video synchronization signal.

10. The multimedia device of claim 1, wherein the distance sensor calculates the viewing distance using an infrared radiation.

11. A method for driving a multimedia device, the method comprising:
    measuring a viewing distance between a user and the multimedia device;
    calculating a reaction time difference between a first reaction time to visual stimuli and a second reaction time to auditory stimuli, based on the viewing distance and a shortest reaction time to auditory stimuli;
    adjusting an output timing of the audio signal and an output timing of the video signal based on the reaction time difference; and
    outputting a sound and an image based on the audio signal and the video signal,
    wherein adjusting the output timing of the audio signal and the output timing of the video signal includes determining a reference distance at which the first reaction time is substantially equal to the second reaction time, outputting the video signal and the same as the reference distance, outputting the video signal before an output of the audio signal based on the reaction time difference when the viewing distance is less than the reference distance, and outputting the audio signal before an output of the video signal based on the reaction time difference when the viewing distance is greater than the reference distance.

12. The multimedia device of claim 11, wherein the first reaction time is determined to have a substantially constant value independently of the viewing distance.

13. The multimedia device of claim 12, wherein the second reaction time is determined to linearly increase as the viewing distance increases.

14. The multimedia device of claim 13, wherein an output time difference between the output timing of the video signal and the output timing of the audio signal is substantially the same as the reaction time difference.

15. The multimedia device of claim 13, wherein an output time difference between the output timing of the video signal and the output timing of the audio signal corresponds to clock signal durations which is the nearest to the reaction time difference.

* * * * *